Feb. 28, 1933.　　　　C. H. GAGEN　　　　1,899,028
AIR FILTER
Filed July 14, 1927　　　　2 Sheets-Sheet 2
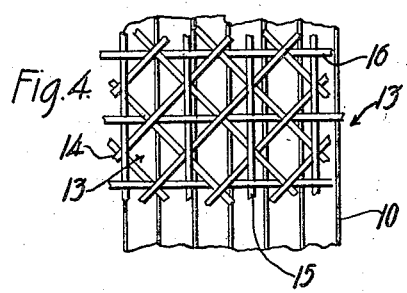
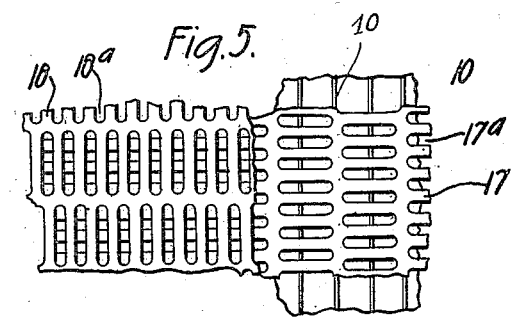
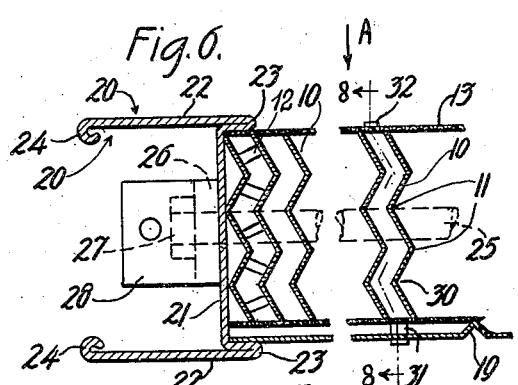
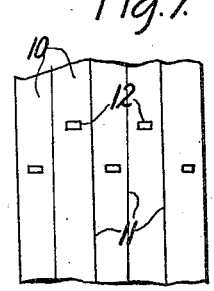
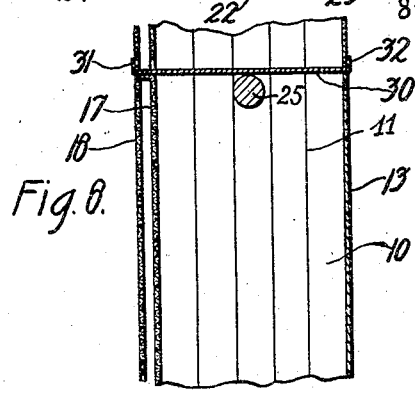
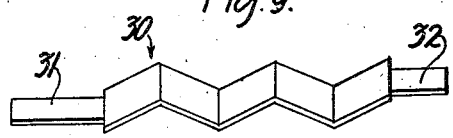
Inventor
CHARLES H. GAGEN,
By his Attorney Julian J. Wittal Patented Feb. 28, 1933

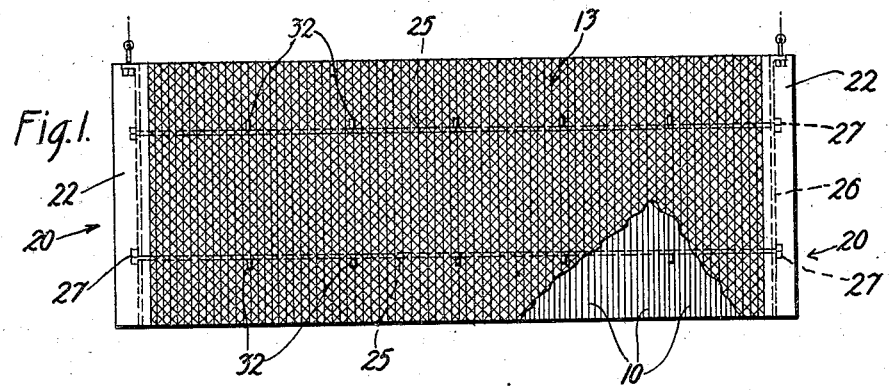
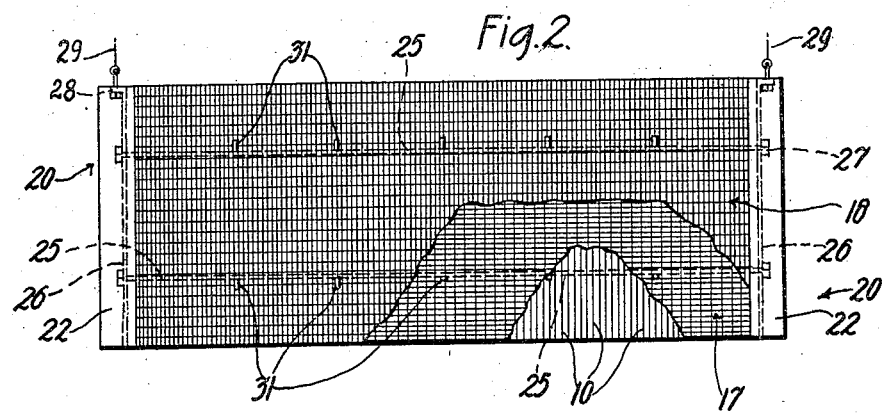
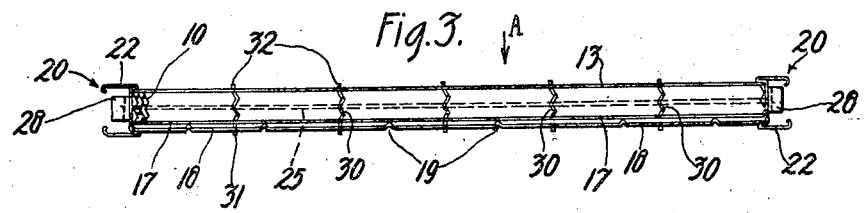

1,899,028

UNITED STATES PATENT OFFICE

CHARLES H. GAGEN, OF MONTCLAIR, NEW JERSEY, ASSIGNOR, BY MESNE ASSIGNMENTS, TO AMERICAN AIR FILTER COMPANY, INC., OF LOUISVILLE, KENTUCKY, A CORPORATION OF DELAWARE

AIR FILTER

Application filed July 14, 1927. Serial No. 205,636.

This invention relates to air filtering devices adapted to be used in the ventilating systems of buildings and for other large scale operations.

One object of this invention is to provide a filtering device of highly improved construction to be especially effective to remove foreign particles from air, which device shall be compact in arrangement and afford a minimum resistance to the flow of air therethrough, so that large or small quantities of air can be cleaned rapidly and efficiently.

A further object of this invention is to provide an air filter unit of simplified construction and which is particularly inexpensive to manufacture, and can be readily mounted in place wherever it may be required.

A further object of this invention is to provide an air filtering device which shall employ plates having multiple planes for effective eddying of the air and contact with the plates in combination with metallic screens that are preferably of standard character, said screens affording an increased surface contact with the air, aiding in the retention of foreign matter and in the distribution of the air thru the filter.

A further object of this invention is to provide an air filter of the character set forth including plates extending transverse to the filter, and an auxiliary screening device extending parallel to the plane of the filter.

A further object of this invention is to provide an air filter of the character set forth, having improved means for spacing, coordinating, and mounting the several parts and members thereof.

A further object of the invention is to provide an air filter having improved means to distribute the flow of air therethrough.

Still a further object of this invention is to provide an air filter as above set forth that is coated with oil or other viscous fluid, that coacts in an improved manner with the filter parts for most effective and uniformly efficient removal of dust particles from the air, and for a maximum period of time before cleaning of the filter is required.

Other objects will in part be evident and in part pointed out hereinafter.

Accordingly, the invention takes the form shown in the drawings to illustrate one particular embodiment of the invention, the scope whereof will be indicated in the appended claims, and in which, Fig. 1 is a view in elevation of the filter, showing the side thru which the air enters, parts being broken away to show the internal construction.

Fig. 2 is a view in elevation of the opposite side of the filter, parts being broken away.

Fig. 3 is a top plan view of the filter shown in Fig. 2.

Figs. 4 and 5 are fragmentary views on an enlarged scale showing details of the filter.

Fig. 6 is a sectional detail view of a part of the filter.

Fig. 7 is a detail view of a portion of a filter plate.

Fig. 8 is a sectional view taken on line 8—8 of Fig. 6.

Fig. 9 is a perspective view of a detail of the invention.

Referring in detail to the drawings, the invention is shown as embodied in a filter unit adapted to be used in any appropriate air cleaning machine, especially in the one disclosed in my copending application Serial No. 179,128 filed March 28, 1927.

Said filter unit comprises a plurality of spaced plates 10 made of sheet metal or other suitable material and bent longitudinally as at 11, to provide multiple surfaces to ensure contact with all parts of the air for removal of foreign matter therefrom, said plates providing a large number of air channels that have corners or bends for causing the air to eddy so that said plates will thoroughly filter the air. Preferably said plates are disposed vertically, and lugs 12 are struck therefrom to uniformly space the plates.

Extending over the inlet side of the plates 10, which is indicated by arrow A (Fig. 3) that shows the direction of flow of the air through the filter, is a screen 13 which may be of standard construction. Said screen 13, is positioned transversely to the said plates and is made as a mesh work of interwoven flat wires, the flat sides of the wires lying in the plane of said screen. Said screen serves to distribute the air over the entire filter, dividing the air stream into innumerable small air currents, and in addition provides additional surface contact with the air serving primarily to remove the roughest or large dust particles and foreign matter therefrom.

While the inlet screen 13 may be of any suitable construction, it is preferably made of wires 14 (Fig. 1) extending diagonally of the filter unit, and interwoven with the vertical wires 15 and the horizontal wires 16. In this way the said inlet screen forms a particularly strong structure which can be used with a high degree of reliability. Said screen is placed preferably directly in contact with the adjacent edges of plates 10, and may be mounted thereon as disclosed hereinafter.

A screening device may likewise be provided at the outlet side of the filter plates, and said device comprises one or more screens such as shown at 17 and 18 (Fig. 5). The screens 17 and 18 extend transversely to the filter plates 10, the screen 17 being preferably in contact with the adjacent edges of said plates, while the screen 18 is spaced from its companion screen 17. The screens 17 and 18 increase the efficiency of the filter unit, since they serve to promote eddying of the air between the plates 10, increase the surface contact with the air, and provide what is in the nature of a fine comb for ensuring absolute cleanliness of the air.

The screens 17 and 18 may be of any suitable construction, and preferably are of a standard type. Each is made of flat sheet metal having openings stamped therein, the openings 17a, in screen 17 being of horizontal form and those 18a, in screen 18, being vertical in form, so that the openings in one screen are at an angle to those in the other screen for a most efficient mixing of and contact with the air. The screens 17 and 18 may be spaced apart by mounds 19 (Figs. 3 and 6) or otherwise, struck in the former screen, and are mounted in a manner to be described hereinafter. Either or both forms of screens may be used in front or back of the filter.

In use the filter unit is coated with oil or other suitable viscous fluid so that foreign particles can be removed from the air with the greatest reliability. Thus the filter plates 10 and the screens 13, 17 and 18 offer a maximum surface area that is oil coated. Furthermore, while the plates 10 will have an oil film of uniform fineness, the screens may retain globules of oil that will permit the filter to function for a maximum period of time and at a uniformly high efficiency.

The several parts of the filter are coordinated and secured together in any suitable manner to form a compact filter unit, that can be readily mounted for use in any machine and especially for vertical movement along suitable guides, as shown in my aforesaid copending application, so that said filter unit can be lowered into a bath of oil to be cleaned and coated with a new film of oil, and then elevated into operating position.

For this purpose the filter unit in the preferred embodiment shown is provided with frame or plate retaining members 20 (Figs. 3 and 6) at the sides of the filter, that are of H form in cross section, each of said members being formed of a single sheet of material pressed into the desired shape. More specifically, said frame members have each a web 21 and side flanges 22 united with the web by bends at 23. The flanges 22 may be finished by beads 24 extending along the free edges of said flanges remote from the bends 23. Received snugly between the flanges 22 at the bends 23 is the adjacent edge portion of the filter, with which the web 21 makes contact. A plurality of rods 25 at the upper and lower parts of the filter pass transversely through plates 10 and webs 21, and also through bars 26 extending vertically within the frame members and to which said rods are secured by nuts 27. The rods 25 thus serve to tie all the plates 10 securely together, and provide a construction that is at once simple and efficient. The bars 26 are bent at their upper ends to form angle lugs 28 to which chain 29 can be fastened whereby the filter unit can be raised or lowered.

To tie the screens 13, 17 and 18 to the filter unit at points remote from frame members 20, a plurality of zigzag bars 30 following the shape of the air channels between plates 10 are provided, and having tongues 31 and 32 at their ends the former of which passes through a suitable opening in screens 17, 18, and is bent upward as shown in Fig. 8, and the latter of which similarly fastens screen 13.

Plates 10 being spaced by lugs 12 and having no metal enclosure at bottom or top thereby provide a knife-like cleaning action as the entire filter screen is lowered or collapsed into the bath of oil. This knife-like action divides the large body of bath oil into extremely fine streams as the filter screen is lowered or collapsed into the bath of oil. The fine stream of oil acts brush-like on both sides of plates 10 thereby removing all the accumulated dust or foreign matter. The open top and bottom permits of quick access to the filter media of all cleaning oil.

I claim:

1. A filter comprising a plurality of spaced plates disposed side by side to form a series of sharply bent channels through which a stream of fluid is adapted to pass, and a plurality of screens extending transversely of said plates, one of said screens adapted to present relatively little obstruction to said stream being disposed on the inlet side of said channels, and the other adapted to present greater obstruction to said stream being disposed on the outlet side thereof.

2. A filter comprising a plurality of spaced plates disposed side by side to form a series of gas channels, and a plurality of thin screens extending transversely of said plates, one of said screens being at the inlet side of said channels, and a pair of said screens spaced from one another at the outlet side of said channels, the latter screens having openings in one of the screens arranged differently than the openings in the other screens to break up the fluid flow.

3. A filter comprising a plurality of spaced plates, said plates being bent longitudinally to form tortuous fluid channels, a thin screen on the inlet side of said channels extending transversely to said channels, and a plurality of thin spaced screens on the outlet side of said channels extending transversely to said channels, the openings in one of the latter screens being differently disposed than the adjacent openings in the other screen.

4. In a device of the character described, comprising filter means having a plurality of plates extending side by side, a tie-rod extending through said plates transversely of the length of the plates, and a pair of frame members having a web and flanges thereon on the side edges of said filter means, each frame member engaging said filter means between the flanges of said frame, said tie-rod engaging said web.

5. A device as set forth in claim 4, wherein said filter means comprises a screen on each side of the series of plates, and said frame members engage said screens and said plates between the flanges thereof, as aforesaid.

6. A filter cell comprising plate retainers, a plurality of plates interposed in spaced relation between said retainers and with their opposite end edges exposed between end edges of the retainers, a screen disposed between said retainers and across lateral edges of said plates, and means extending through the plates for securing said retainers, plates and screen in operative assembled relation.

Signed at New York, in the county and State of New York, this 11th day of July, 1927.

CHARLES H. GAGEN.